United States Patent
Kim et al.

(10) Patent No.: US 12,534,819 B2
(45) Date of Patent: Jan. 27, 2026

(54) CERIUM OXIDE NANOPARTICLES, METHODS FOR FABRICATING THE SAME AND METHODS FOR FABRICATING A SEMICONDUCTOR DEVICE USING THE SAME

(71) Applicant: Samsung Electronics Co., Ltd., Suwon-si (KR)

(72) Inventors: In Kwon Kim, Hwaseong-si (KR); Kyu Hyoung Lee, Seoul (KR); Sang Kyun Kim, Hwaseong-si (KR); Chul Oh Park, Seoul (KR); Min Young Kim, Busan (KR); Hyo San Lee, Seongnam-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 746 days.

(21) Appl. No.: 17/874,442

(22) Filed: Jul. 27, 2022

(65) Prior Publication Data

US 2023/0167566 A1   Jun. 1, 2023

(30) Foreign Application Priority Data

Nov. 30, 2021   (KR) .................. 10-2021-0168341

(51) Int. Cl.
| | | |
|---|---|---|
| *C25C 7/00* | (2006.01) | |
| *C25B 1/01* | (2021.01) | |
| *C25B 1/50* | (2021.01) | |
| *C25C 5/00* | (2006.01) | |
| *C25C 7/04* | (2006.01) | |
| *C25C 7/08* | (2006.01) | |

(52) U.S. Cl.
CPC ............. *C25C 7/002* (2013.01); *C25C 5/00* (2013.01); *C25C 7/04* (2013.01); *C25C 7/08* (2013.01)

(58) Field of Classification Search
CPC .. C25C 7/002; C25C 5/00; C25C 7/04; C25C 7/08; C25B 1/01; C25B 1/50
USPC ........................................................ 205/766
See application file for complete search history.

(56) References Cited

U.S. PATENT DOCUMENTS

| | | | |
|---|---|---|---|
| 6,855,635 | B2 | 2/2005 | Schumacher et al. |
| 9,561,491 | B2 | 2/2017 | Cheung et al. |
| 9,725,620 | B2 | 8/2017 | Huang et al. |
| 2006/0032147 | A1 | 2/2006 | So et al. |
| 2006/0032150 | A1 | 2/2006 | So et al. |
| 2006/0032836 | A1 | 2/2006 | Feng et al. |
| 2006/0150526 | A1* | 7/2006 | Ota ...................... C09K 3/1409 106/3 |

(Continued)

FOREIGN PATENT DOCUMENTS

| | | |
|---|---|---|
| CN | 107673391 A | 2/2018 |
| CN | 108821324 A | 11/2018 |
| CN | 109054655 A | 12/2018 |

(Continued)

*Primary Examiner* — Zulmariam Mendez
(74) *Attorney, Agent, or Firm* — Wolf, Greenfield & Sacks, P.C.

(57) ABSTRACT

Cerium oxide nanoparticles and methods of fabricating the same are provided. The cerium oxide nanoparticles may be fabricated by a method that may include injecting metal ions into cerium oxide particles and then removing (e.g., desorbing) at least some of the injected metal ions from the cerium oxide particles.

16 Claims, 14 Drawing Sheets

(56) References Cited

U.S. PATENT DOCUMENTS

2019/0161869 A1\* 5/2019 Bisselink ................. C25B 9/23

FOREIGN PATENT DOCUMENTS

| KR | 20200133414 A | 11/2020 |
| KR | 20200133418 A | 11/2020 |
| KR | 20200133419 A | 11/2020 |
| KR | 20210050245 A | 5/2021 |
| KR | 20210056586 A | 5/2021 |

\* cited by examiner

FIG. 8
Comparative Example
Experimental Example 1
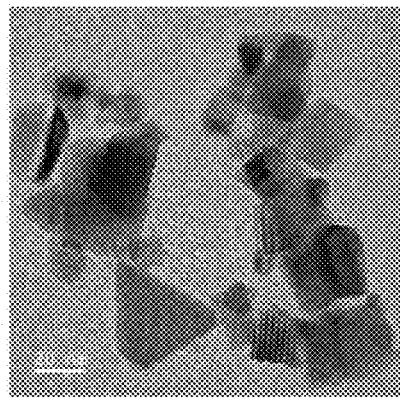
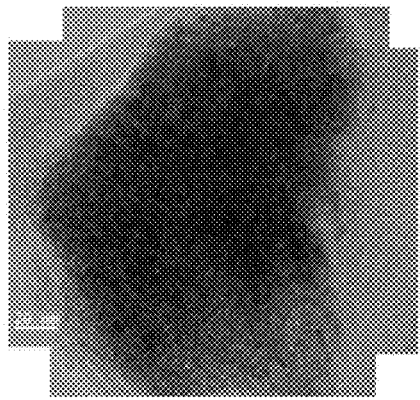
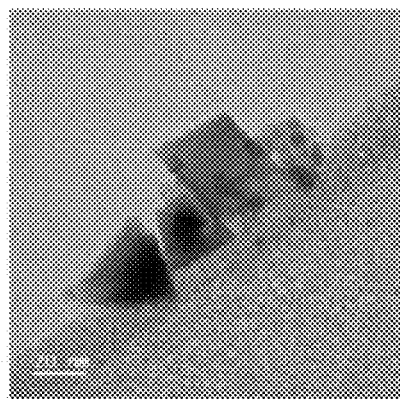
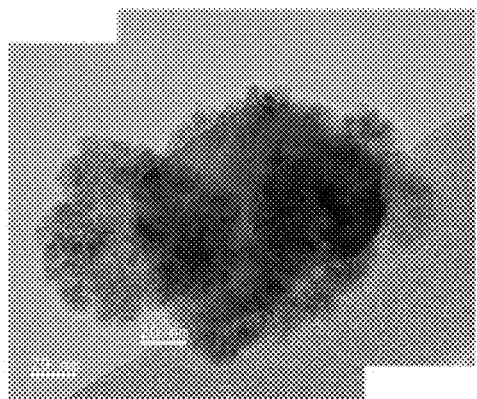

FIG. 9
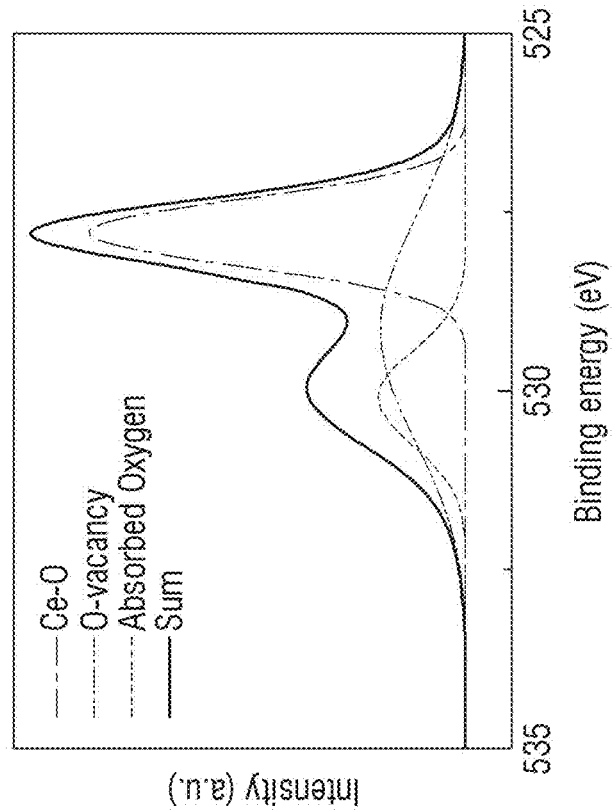
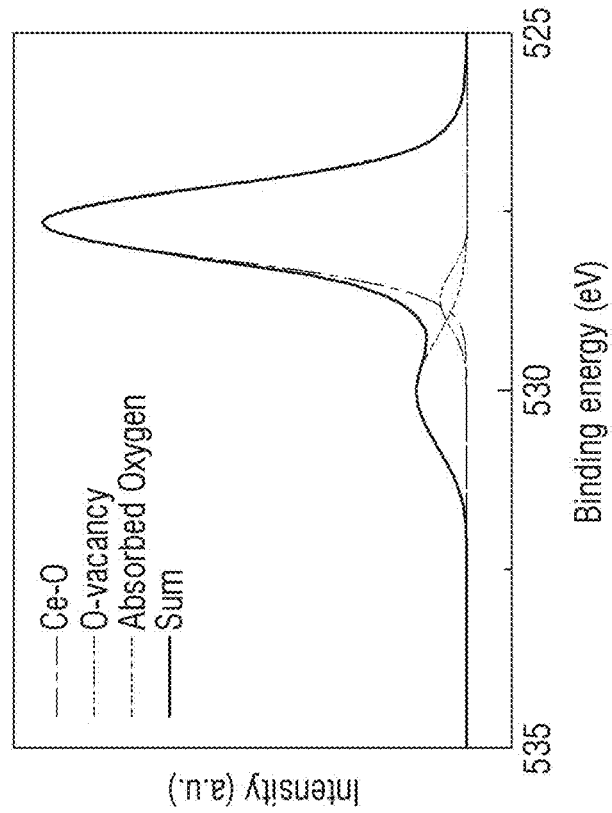

CERIUM OXIDE NANOPARTICLES, METHODS FOR FABRICATING THE SAME AND METHODS FOR FABRICATING A SEMICONDUCTOR DEVICE USING THE SAME

CROSS-REFERENCE TO RELATED APPLICATION

This application claims priority from Korean Patent Application No. 10-2021-0168341 filed on Nov. 30, 2021, in the Korean Intellectual Property Office, and all the benefits accruing therefrom under 35 U.S.C. 119, the contents of which in its entirety are herein incorporated by reference.

BACKGROUND

The present disclosure relates to cerium oxide nanoparticles, a method for fabricating the same, and a method for fabricating a semiconductor device using the same. More specifically, the present disclosure relates to cerium oxide nanoparticles having controlled surface defects, a method for fabricating the same, and a method for fabricating a semiconductor device using the same.

With downsizing of electronic devices and miniaturization of integrated circuits, various methods for forming fine patterns having a width of several nanometers are being studied. Such a fine pattern may be formed on a flat surface that may be formed by a flattening process such as a chemical mechanical polishing (CMP) process. The chemical mechanical polishing process may include providing a polishing slurry between a semiconductor substrate on which the polishing process is performed and a polishing pad, and then bringing the semiconductor substrate into contact with the polishing pad and rotating it, thereby flattening the surface of the semiconductor substrate by pressing and rotating.

On the other hand, cerium oxide nanoparticles, also called ceria, are functional ceramic materials used as, for example, catalysts or abrasives in various fields, and are widely used as main component of polishing slurry compositions, especially in the chemical mechanical polishing process. Cerium oxide nanoparticles may generate scratches on a surface of a substrate in the chemical mechanical polishing process, and thus cerium oxide nanoparticles in which the shape, size and the like of the particles are controlled are being studied.

SUMMARY

Aspects of the present disclosure provide cerium oxide nanoparticles having controlled surface defects.

Aspects of the present disclosure also provide methods for fabricating cerium oxide nanoparticles in which surface defects are controlled.

Aspects of the present disclosure also provide methods for fabricating a semiconductor device using a polishing slurry including cerium oxide nanoparticles having controlled surface defects.

According to some embodiments of the present inventive concept, methods for fabricating cerium oxide nanoparticles are provided. The methods may include providing a structure that includes a cathode functional layer including cerium oxide particles, an ion generating layer including metal and a separating membrane between the cathode functional layer and the ion generating layer, applying a voltage across the cathode functional layer and the ion generating layer, thereby injecting metal ions generated from the ion generating layer into the cathode functional layer and cleaning the cathode functional layer to remove (e.g., desorb) at least some of the metal ions from the cathode functional layer.

According to some embodiments of the present inventive concept, methods for fabricating cerium oxide nanoparticles are provided. The methods may include providing a cell that includes a cathode functional layer including cerium oxide particles, an ion generating layer including lithium (Li), and a separating membrane between the cathode functional layer and the ion generating layer, applying a voltage to the cell to inject lithium ions into the cathode functional layer, separating the cathode functional layer from the cell and cleaning the cathode functional layer using an organic solvent.

According to some embodiments of the present inventive concept, a cerium oxide nanoparticle is provided. The cerium oxide nanoparticle may be fabricated by a method including: injecting metal ions into cerium oxide particles; and then removing (e.g., desorbing) at least some of the metal ions from the cerium oxide particles. The cerium oxide nanoparticle is represented by following Chemical formula 1: [Chemical formula 1] $CeO_{2-x}$, and x is $0<x\leq1.0$.

According to some embodiments of the present inventive concept, methods for fabricating a semiconductor device are provided. The methods may include providing a target film on a semiconductor substrate and performing a chemical mechanical polishing process on the target film, using a polishing slurry including cerium oxide nanoparticles, wherein the cerium oxide nanoparticles are fabricated by injecting metal ions into cerium oxide particles and then removing (e.g., desorbing) at least some of the metal ions from the cerium oxide nanoparticles. The cerium oxide nanoparticles are represented by following Chemical formula 1: [Chemical formula 1] $CeO_{2-x}$, and x is $0<x\leq1.0$.

According to some embodiments of the present inventive concept, methods of fabricating cerium oxide nanoparticles are provided. The methods may include injecting metal ions into cerium oxide particles, and then removing at least some of the metal ions from the cerium oxide particles. The cerium oxide nanoparticles are represented by Chemical formula 1: [Chemical formula 1] $CeO_{2-x}$, and x is $0<x\leq1.0$.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail some embodiments thereof with reference to the attached drawings, in which:

FIG. 8 is a TEM (Transmission electron microscopy) measurement result of the cerium oxide particles fabricated according to Experimental example 1 and Comparative example.

FIG. 9 is an XPS (X-ray photoelectron spectrometer) measurement result of the cerium oxide particles fabricated according to Experimental example 1 and Comparative example.

DETAILED DESCRIPTION

Figure 2:
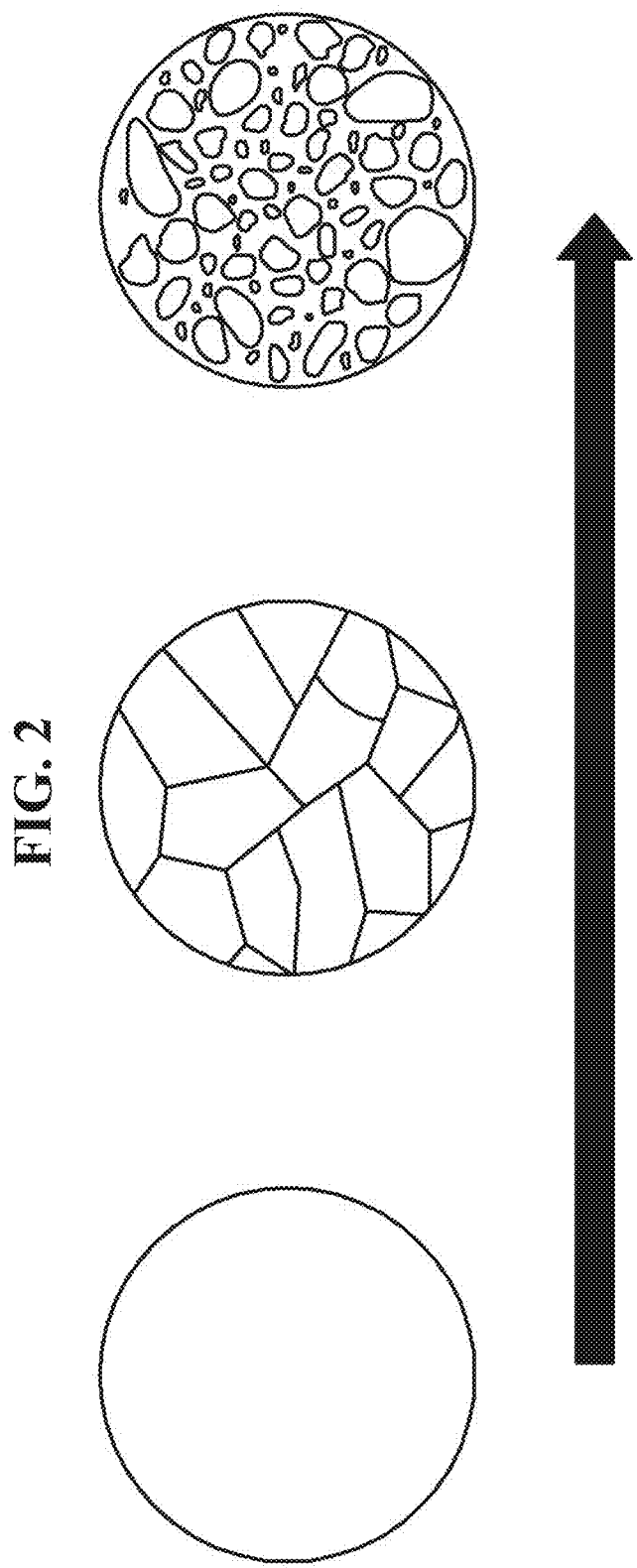
FIG. 2 is a schematic diagram for explaining an atomization process of cerium oxide nanoparticles according to some embodiments.
Figure 3:
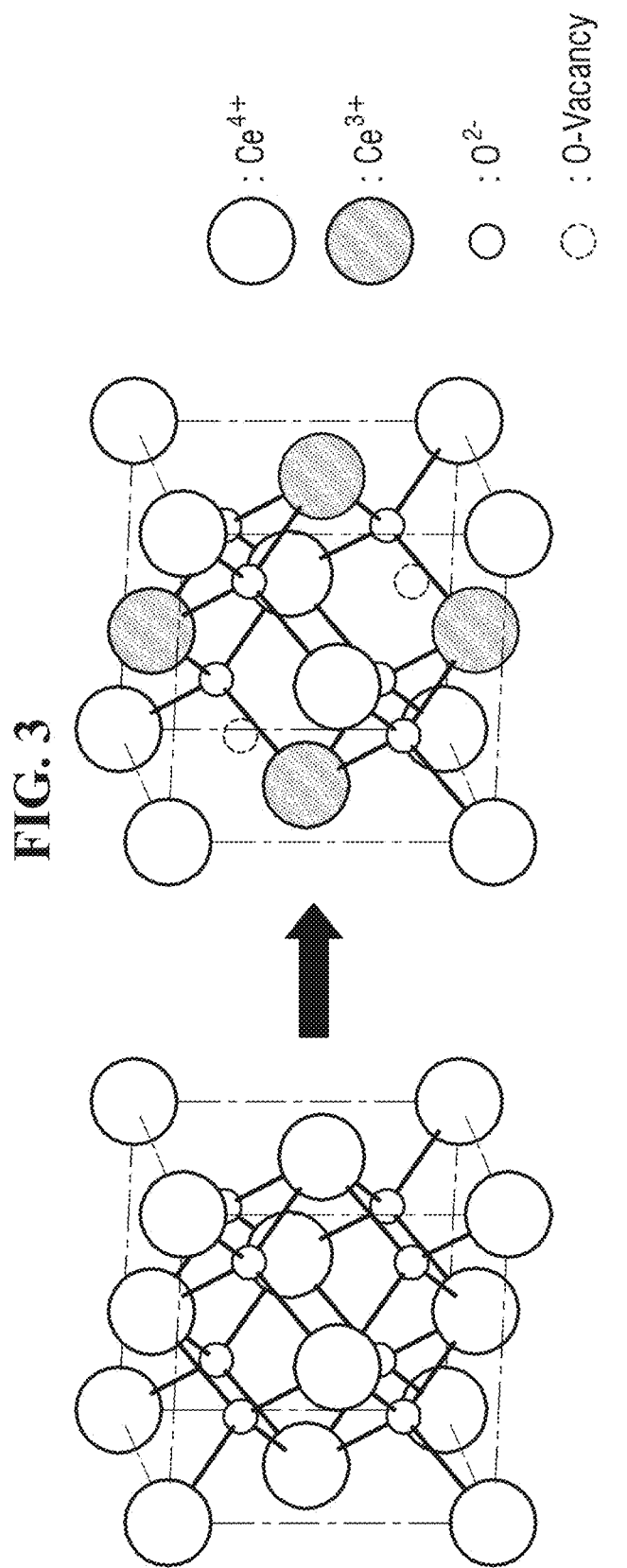
FIG. 3 is a schematic diagram for explaining a lattice structure of surfaces of the cerium oxide nanoparticles according to some embodiments.

Hereinafter, cerium oxide nanoparticles and methods for fabricating the same will be described referring to FIGS. 1 to 3. However, these are merely examples, and the present invention is not limited to these embodiments.

Figure 1:
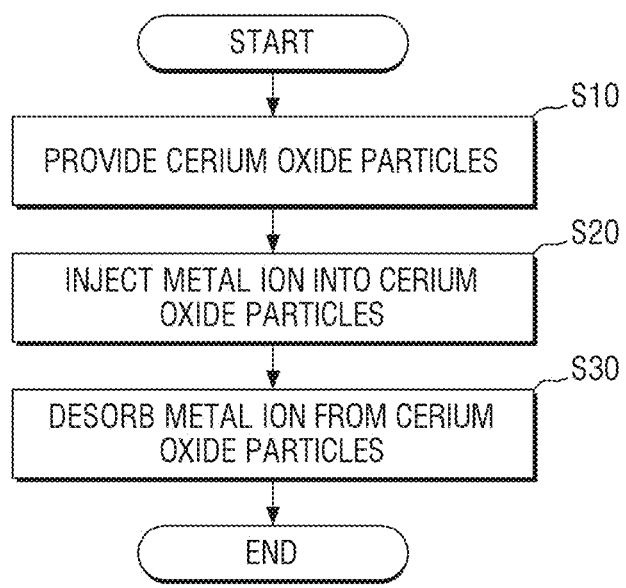
FIG. 1 is a flowchart for explaining the method for fabricating the cerium oxide nanoparticles according to some embodiments.

FIG. 1 is a flowchart for explaining the method for fabricating the cerium oxide nanoparticles according to some embodiments of the present invention. FIG. 2 is a schematic diagram for explaining an atomization process of cerium oxide nanoparticles according to some embodiments of the present invention. FIG. 3 is a schematic diagram for explaining a lattice structure of surfaces of the cerium oxide nanoparticles according to some embodiments of the present invention.

The cerium oxide nanoparticles according to some embodiments may be fabricated by injection and removal (e.g., desorption) of metal ions into and from cerium oxide particles (e.g., $CeO_2$ particles). Removal of the metal ions from the cerium oxide particles may remove at least portion of the metal ions injected in the cerium oxide particles. In some embodiments, the metal ions injected in the cerium oxide particles may be completely removed from the cerium oxide particles, and thus the cerium oxide particles may be devoid of the metal ions after removal of the metal ions. Specifically, referring to FIG. 1, cerium oxide nanoparticles according to some embodiments may be fabricated by providing cerium oxide particles (S10), injecting metal ions into the cerium oxide particles (S20), and removing (e.g., desorbing) some or all of the metal ions from the cerium oxide particles (S30).

The metal ion may be at least one of an alkali metal cation and an alkaline earth metal cation. For example, the metal ion may include at least one of a lithium ion ($Li^+$), sodium ion ($Na^+$), a potassium ion ($K^+$), a magnesium ion ($Mg^{2+}$), and a calcium ion ($Ca^{2+}$). In some embodiments, the metal ion may include lithium ion ($Li^+$).

The injection of metal ions into the cerium oxide particles (S20) may be performed, using, for example, a constant current method or a constant voltage method.

Desorption of metal ions from the cerium oxide particles (S30) may be performed, for example, by cleaning the cerium oxide particles with an organic solvent, distilled water and/or an acidic aqueous solution.

The metal ions injected into and desorbed from the cerium oxide particles (e.g., $CeO_2$ particles) may deepen the lattice distortion of the cerium oxide particles, and cerium oxide nanoparticles according to some embodiments may be fabricated. For example, referring to FIG. 2, as the metal ions are injected into and desorbed from the cerium oxide particles, the cerium oxide particles may be atomized to form cerium oxide nanoparticles according to some embodiments.

An average size of the cerium oxide nanoparticles according to some embodiments may be about 20 nm or less. For example, the average size of cerium oxide nanoparticles according to some embodiments may be from about 1 nm to about 20 nm. Preferably, the average size of the cerium oxide nanoparticles according to some embodiments may be from about 3 nm to about 10 nm. When the average size of the cerium oxide nanoparticles exceeds about 20 nm, a polishing efficiency of the chemical mechanical polishing process using the cerium oxide nanoparticles may decrease.

The cerium oxide nanoparticles according to some embodiments may include surface defects. For example, metal ions injected into and desorbed from cerium oxide particles (e.g., $CeO_2$ particles) may distort the lattice structure of the cerium oxide particles to cause surface defects. The cerium oxide nanoparticles according to some embodiments may be represented by the following chemical formula 1.

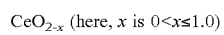

$CeO_{2-x}$ (here, $x$ is $0 < x \leq 1.0$)     [Chemical formula 1]

The surface of the cerium oxide nanoparticles according to some embodiments may include $Ce^{3+}$ and an oxygen vacancy (O-vacancy). For example, referring to FIG. 3, as the metal ions are injected into and desorbed from the cerium oxide particles, defects may be generated on the surface of the cerium oxide particles to form cerium oxide nanoparticles including $Ce^{3+}$ and oxygen vacancies.

More specifically, the cerium oxide particles (for example, $CeO_2$ particles) may have a lattice structure of a fluorite structure. The metal ions injected into such cerium oxide particles may form oxygen vacancies in the lattice structure of the cerium oxide particles, by detaching at least some of the oxygen atoms of the cerium oxide particles. Further, at least some of the cerium atoms of the cerium oxide particles may be reduced by the oxygen vacancies formed. As an example, as shown in FIG. 3, two $O^{2-}$ may be detached from the lattice structure of the $CeO_2$ particles, and four $Ce^{4+}$ may be reduced to four $Ce^{3+}$. The cerium oxide nanoparticles including surface defects (e.g., $Ce^{3+}$ and oxygen vacancies) may be fabricated accordingly.

An oxygen vacancy ratio of the surface of the cerium oxide nanoparticles according to some embodiments may be about 50% or less. For example, the oxygen vacancy ratio of the surface of cerium oxide nanoparticles according to some embodiments may be from about 10% to about 50%.

The oxygen vacancy ratio of the surface of cerium oxide nanoparticles according to some embodiments may be from about 15% to about 50%. Preferably, the oxygen vacancy ratio of the surface of the cerium oxide nanoparticles according to some embodiments may be from about 20% to about 50%. When the oxygen vacancy ratio of the surface of the cerium oxide nanoparticles is less than 15%, because the surface defects are insufficient, the polishing efficiency of the chemical mechanical polishing process using the cerium oxide nanoparticles may decrease. When the oxygen vacancy ratio of the surface of the cerium oxide nanoparticles exceeds 50%, a confinement effect due to the nanoparticles may be limited and the reaction efficiency may decrease.

The cerium oxide nanoparticles according to some embodiments may not contain metal ions. For example, the metal ions injected into cerium oxide particles may be completely desorbed after causing the surface defects in the cerium oxide particles.

Hereinafter, cerium oxide nanoparticles according to some embodiments and methods for fabricating the same will be described more specifically referring to FIGS. 4 to 6. However, these are merely examples, and the present invention is not limited to these embodiments. Although the method for fabricating the cerium oxide nanoparticles according to some embodiments will be described centering on the use of cells in the form of coin cells, this is a merely example, and the method for fabricating the cerium oxide nanoparticles according to some embodiments may, of course, use various other forms of cells. For convenience of explanation, repeated parts of contents described using FIGS. 1 to 3 will be briefly described or omitted. As used herein, "cells" may be referred to as "structures."

Figure 4:
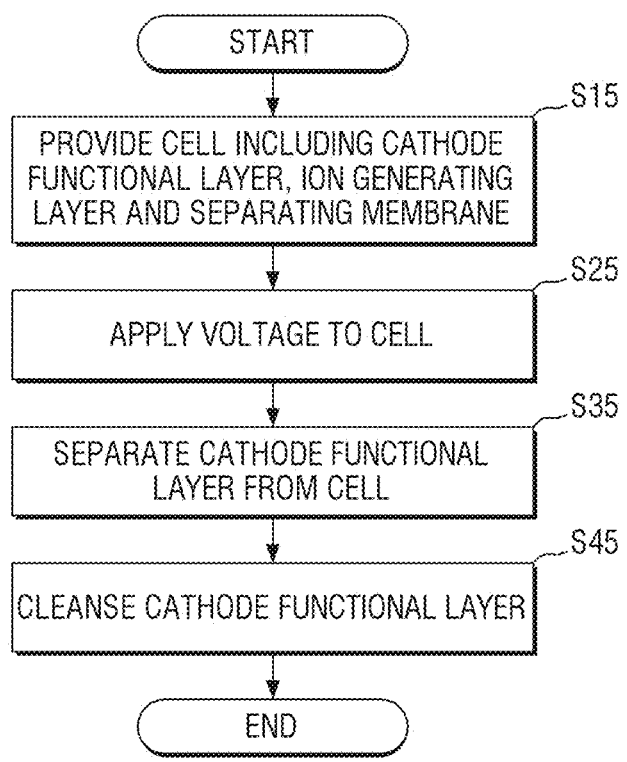
FIG. 4 is a flowchart for explaining the method for fabricating the cerium oxide nanoparticles according to some embodiments of the present invention.

FIG. 4 is a flowchart for explaining a method for fabricating the cerium oxide nanoparticles according to some embodiments of the present invention. FIG. 5 is an exploded perspective view of a cell for fabricating the cerium oxide nanoparticles according to some embodiments of the present invention. FIG. 6 is a schematic diagram for explaining application of a voltage to the cell of FIG. 5.

Figure 5:
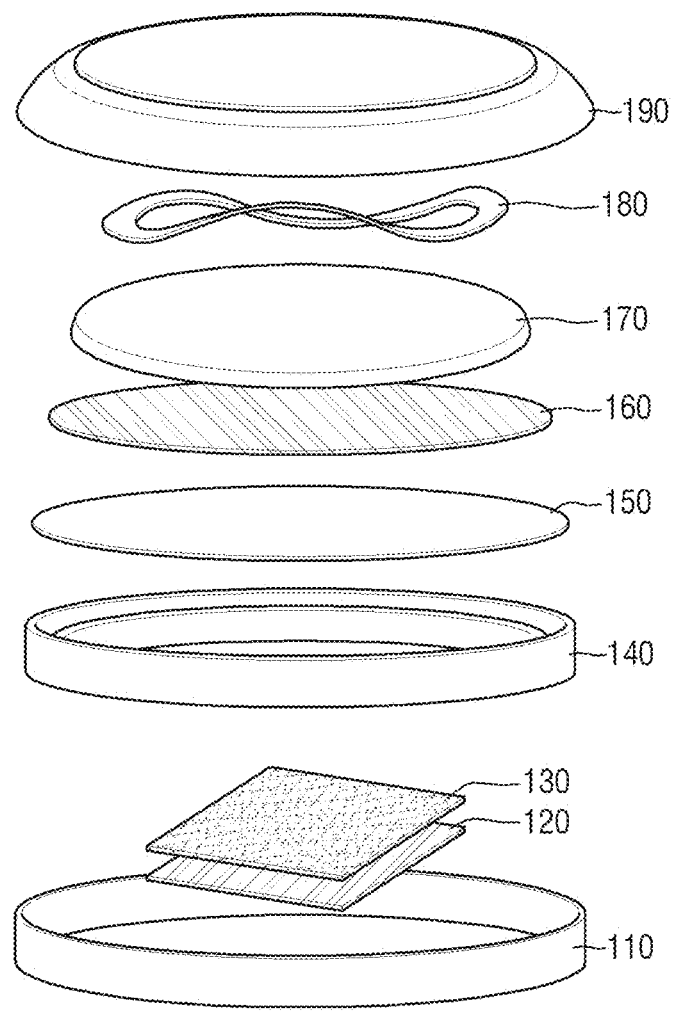
FIG. 5 is an exploded perspective view of a cell for fabricating the cerium oxide nanoparticles according to some embodiments of the present invention.

Referring to FIGS. 4 and 5, a cell 100 including a cathode functional layer 130, an ion generating layer 160 and a separating membrane 150 is provided (S15). For example, as shown in FIG. 5, the cell 100 in the form of a coin cell including a cathode case 110, a base layer 120, a cathode functional layer 130, a gasket 140, a separating membrane 150, an ion generating layer 160, a disk 170, a spring 180, and an anode case 190 may be provided.

The base layer 120, the cathode functional layer 130, the gasket 140, the separating membrane 150, the ion generating layer 160, the disk 170 and the spring 180 may be interposed between the cathode case 110 and the anode case 190. The cathode case 110 and the anode case 190 may each include various metals or alloys that are, for example, oxide film passivity. For example, the cathode case 110 and the anode case 190 may each include, but is not limited to, at least one of stainless steel, aluminum (Al), titanium (Ti), copper (Cu), nickel (Ni), and alloys thereof.

The cathode functional layer 130 may be placed on the cathode case 110 and function as the cathode of the cell 100. The cathode functional layer 130 may include cerium oxide particles (for example, $CeO_2$ particles). For example, the cathode functional layer 130 may be fabricated by applying the slurry including $CeO_2$ particles onto the base layer 120 and then drying the slurry.

The slurry may be fabricated, for example, by mixing a commercially available $CeO_2$ powder with a binder, a conductive material, and an organic solvent.

The binder may include, for example, but is not limited to, at least one of PVDF (Polyvinylidene fluoride), Nafion, PAA (Poly(acrylic acid)), CMC (Carboxymethyl Cellulose), SBR (Styrene-Butadiene Rubber), PTFE (Polytetrafluoroethylene) and Poly (ethylene oxide).

The conductive material may include, for example, but is not limited to, conductive carbon-based materials such as Acetylene black (Denka black), Ketjen black, Channel black, Furnace black, Lamp black, Thermal black, Super-P, SFG-6, and CNT (carbon nanotube).

The organic solvent may include, for example, but is not limited to, at least one of N-Methylpyrrolidone (NMP), ethanol, benzene, potassium hydroxide/methanol (KOH/MeOH), methanol, toluene, dichloromethane, hexane, dimethylformamide (DMF), diisopropyl ether, diethyl ether, dioxane, dimethylacetamide (DMA), dimethyl sulfoxide (DMSO), and chlorobenzene.

A weight ratio of the $CeO_2$ powder contained in the slurry to the binder may be about 90:10 to about 99:1.

The content of organic solvent contained in the slurry may be from about 0.01 mL to about 1 mL per 10 mg of the mixture of $CeO_2$ powder and binder.

The content of the conductive material may be from about 0.1 mg to about 0.5 mg per 10 mg of slurry.

The base layer 120 on which the cathode functional layer 130 is formed may be placed on the cathode case 110. The base layer 120 may transfer electrons to the cathode functional layer 130 by including the conductive material. The base layer 120 may include, but is not limited to, at least one of a metal with good conductivity, for example copper (Cu), aluminum (Al), silver (Ag), stainless steel, and alloys thereof. In some embodiments, the base layer 120 may include copper (Cu).

The base layer 120 may be in the form of foil. The thickness of the base layer 120 may be, for example, from about 10 μm to about 1,000 μm. When the thickness of the base layer 120 is less than 10 μm, the base layer 120 may be easily torn, and when the thickness of the base layer 120 exceeds 1,000 μm, the cell 100 may not be easily fastened.

The ion generating layer 160 is placed on the anode case 190 and may function as the anode of the cell 100. The ion generating layer 160 may include at least one of an alkali metal, an alkaline earth metal, an alkali metal-containing alloy, and an alkaline earth metal-containing alloy. For example, the ion generating layer 160 may include at least one of lithium (Li), sodium (Na), potassium (K), magnesium (Mg), and calcium (Ca). In some embodiments, the ion generating layer 160 may include lithium (Li).

The ion generating layer 160 may be in the form of a foil. The thickness of the ion generating layer 160 may be, for example, about 10 μm to about 1,000 μm. When the thickness of the ion generating layer 160 is less than 10 μm, the ion generating layer 160 may be easily torn, and when the thickness of the ion generating layer 160 exceeds 1,000 μm, the cell 100 may not be easily fastened.

The disk 170 and the spring 180 may be interposed between the ion generating layer 160 and the anode case 190. The ion generating layer 160 may be supported by the disk 170 placed on the anode case 190. The spring 180 is interposed between the anode case 190 and the disk 170 and may prevent the ion generating layer 160 supported by the disk 170 from floating. Although FIG. 5 only shows that the spring 180 is in the form of a wave spring, this is a merely example, and the spring 180 may be in various other forms.

The separating membrane 150 may be interposed between the cathode functional layer 130 and the ion generating layer 160. The cathode functional layer 130 and the ion generating layer 160 are placed on opposing sides of the separating membrane 150, respectively, and may face each other. The separating membrane 150 may include an electrolyte and a porous polymer that is wetted with the electrolyte.

The electrolyte may include metal ions contained in the ion generating layer 160. For example, the electrolyte may include at least one of lithium ion ($Li^+$), sodium ion ($Na^+$), potassium ion ($K^+$), magnesium ion ($Mg^{2+}$), and calcium ion ($Ca^{2+}$). In some embodiments, the electrolyte may include a mixed solution of an organic solvent such as EC (ethylene carboxylate), DEC (diethyl carboxylate) and DMC (dimethyl carboxylate) with $MPF_6$ (here, M is an alkali metal cation or alkaline earth metal cation), or $MPF_6$ aqueous solution. As an example, when the ion generating layer 160 contains lithium (Li), the electrolyte may include $LiPF_6$.

The porous polymer may include, for example but is not limited to, at least one of polypropylene (PP), polyethylene (PE), polytetrafluoroethylene (PTFE), polypropylene coated with aluminum oxide (alumina), cellulose and polypropylene-polyethylene-polypropylene.

The gasket 140 supports the separating membrane 150 and may prevent the electrolyte from flowing out and the separating membrane 150 from being deformed.

Figure 6:
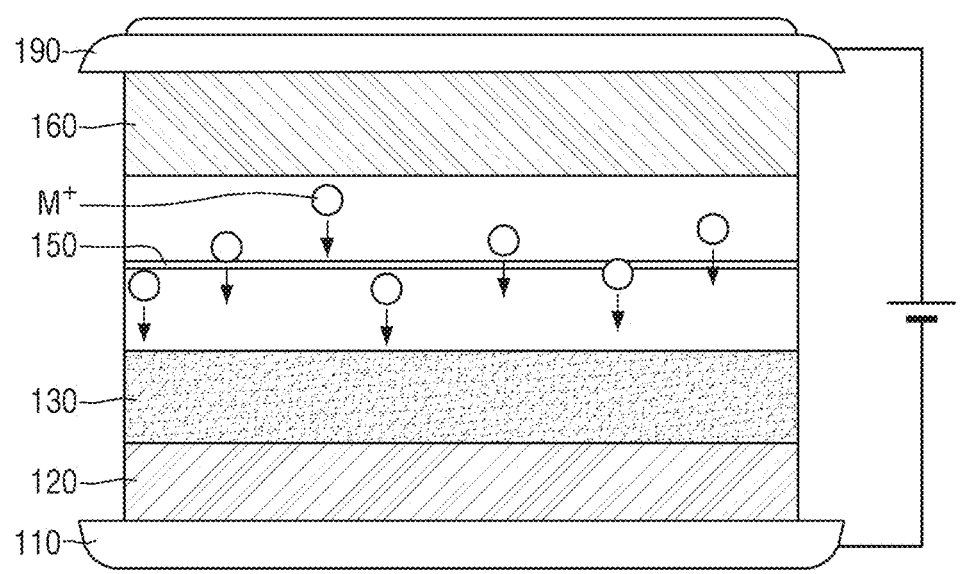
FIG. 6 is a schematic diagram for explaining application of a voltage to the cell of FIG. 5.

Referring to FIGS. 4 and 6, the voltage is applied to the cell 100 (S25). For example, as shown in FIG. 6, a positive (+) voltage may be applied to the anode case 190, and a negative (−) voltage may be applied to the cathode case 110.

As the positive (+) voltage is applied to the anode case 190, an alkali metal cation or an alkaline earth metal cation (hereinafter, metal ion ($M^+$)) may be generated from the ion generating layer 160 by an oxidation reaction due to a potential difference. The generated metal ion ($M^+$) may be dissolved in the electrolyte and move toward the cathode functional layer 130. The separating membrane 150 may be electrically insulated, but the metal ions ($M^+$) may move through the separating membrane 150.

The metal ions ($M^+$) moved through the separating membrane 150 may induce a reduction reaction at the cathode functional layer 130 and be injected into the cerium oxide particles (for example, $CeO_2$ particles) of the cathode functional layer 130. The metal ions ($M^+$) may be injected into the cerium oxide particles by applying a voltage applied across the cathode functional layer 130 and the ion generating layer 160. The injected metal ions ($M^+$) may cause lattice distortion of the cerium oxide particles. When the lattice distortion deepens and the lattice bond is lost with injection of the metal ions ($M^+$), the cerium oxide particles may be atomized. Also, the cerium oxide particles may include defects depending on the degree of lattice distortion. Defects may include, for example, vacancy, oxygen vacancy, intergranular defects, and/or the like.

When a constant current flows through the cell 100, the voltage gradually decreases from the initially applied voltage, and the reaction proceeds. The constant current applied to the cell 100 may be, for example, from about −1 μA to about −500 μA.

The degree of lattice distortion and defects of the cerium oxide particles may be adjusted depending on the degree of injection of metal ions ($M^+$). For example, the oxygen vacancy ratio of the surface of the cerium oxide nanoparticles according to some embodiments may be controlled by the magnitude of the voltage applied to the cell 100, the magnitude of the current applied to the cell 100, the time at which the voltage and the current are applied to the cell 100, and the like. Cerium oxide nanoparticles having a quantified $Ce^{3+}$ concentration and oxygen vacancy ratio on the surface may be provided accordingly.

Referring to FIG. 4 again, the cathode functional layer 130 may then be separated from the cell 100 (S35). For example, the cell 100 of FIG. 5 may be disassembled, and the cathode functional layer 130 may be separated from the disassembled cell 100.

Next, referring to FIG. 4, the cathode functional layer 130 is cleaned (S45). For example, the cathode functional layer 130 separated from the cell 100 of FIG. 5 may be cleaned with an organic solvent. As the cathode functional layer 130 is cleaned, metal ions ($M^+$) may be desorbed from the cerium oxide particles. Therefore, as described above in FIG. 2, atomized cerium oxide nanoparticles may be fabricated. Further, as described above in FIG. 3, cerium oxide nanoparticles including $Ce^{3+}$ and oxygen vacancies ratio on the surface may be fabricated.

The organic solvent may include, for example, but is not limited to, at least one of acetone, ethanol, anhydrous tetrahydrofuran (THF), benzene, potassium hydroxide/methanol (KOH/MeOH), methanol, toluene, dichloromethane, hexane, dimethylmethanamide, dimethylformamide (DMF), diisopropyl ether, diethyl ether, dioxane, dimethylacetamide (DMA), dimethyl sulfoxide (DMSO), and chlorobenzene.

The method for fabricating cerium oxide nanoparticles according to some embodiments may further include cleaning of the cathode functional layer 130 with an organic solvent, and then, cleaning of the organic solvent with distilled water and/or an acidic aqueous solution.

For example, as the cathode functional layer 130 is cleaned with the organic solvent, while the binder is removed from the cathode functional layer 130, cerium oxide nanoparticles of condensed form may be generated. The cerium oxide nanoparticles of condensed form may be separated separately and cleaned with distilled water. The metal ions ($M^+$) remaining in the cerium oxide nanoparticles may be removed accordingly. In some embodiments, the cathode functional layer 130 may be additionally cleaned with an acidic aqueous solution and neutralized with distilled water. The concentration of the acidic aqueous solution may be, for example, 0.1 mM to 1 mM. The acidic aqueous solution may include, but is not limited to, an acetic acid aqueous solution.

In some embodiments, the cathode functional layer 130 may be dried after being cleaned. Therefore, the cerium oxide nanoparticles according to some embodiments may be used as a powder.

In some embodiments, the cathode functional layer 130 may be dispersed in water or an organic solvent after being cleaned. Therefore, the cerium oxide nanoparticles according to some embodiments may be used as a dispersion system.

Hereinafter, the cerium oxide nanoparticles and the method for fabricating the same according to some embodiments will be described more specifically referring to the following experimental examples, the following comparative examples, and FIGS. 7 to 9. However, these are merely examples, and the present invention is not limited to these embodiments. For convenience of explanation, repeated parts of contents described using FIGS. 1 to 6 will be briefly described or omitted.

Figure 7:
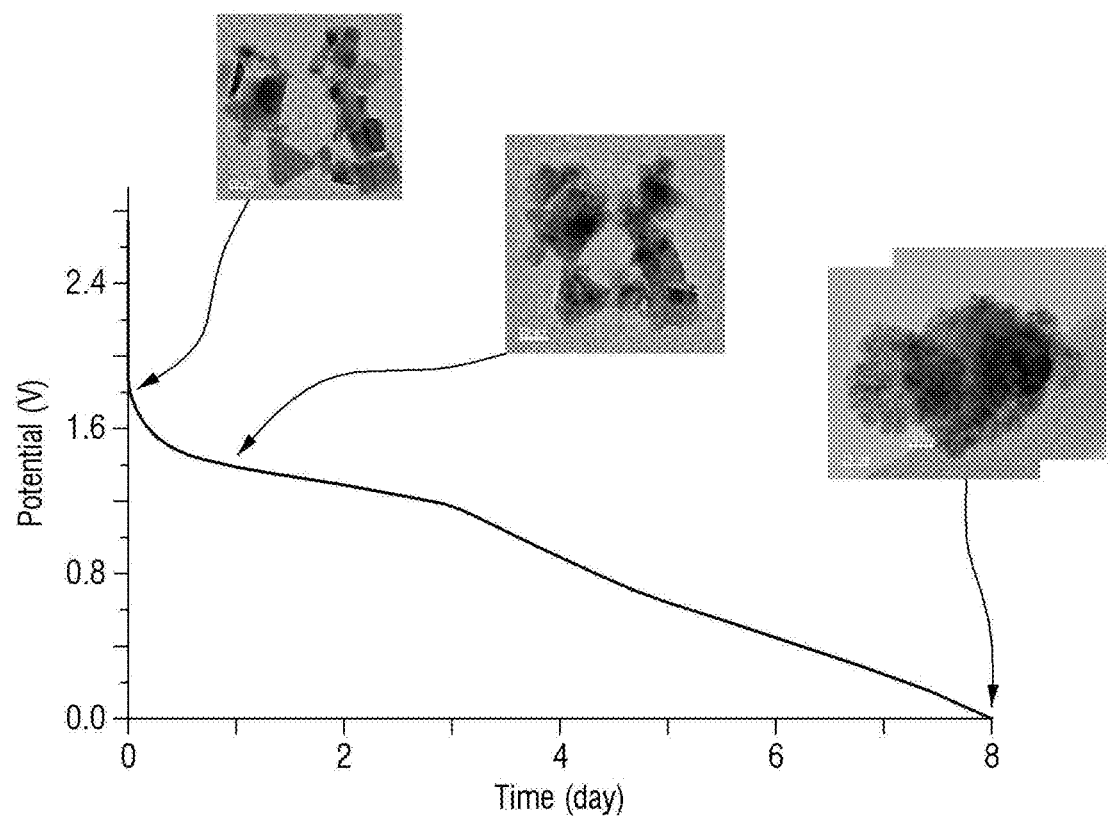
FIG. 7 is a GCPL (Galvanostatic cycling with potential limitation) graph of a cell according to Experimental example 1.

FIG. 7 is a GCPL (Galvanostatic cycling with potential limitation) graph of a cell according to Experimental example 1. FIG. 8 is a TEM (Transmission electron microscopy) measurement result of the cerium oxide particles fabricated according to Experimental example 1 and a Comparative example. FIG. 9 is an XPS (X-ray photoelectron spectrometer) measurement result of the cerium oxide particles fabricated according to Experimental example 1 and a Comparative example.

Experimental Example 1

$CeO_2$ powder having a particle size of about 50 nm to about 70 nm was used. A slurry was fabricated by mixing 0.94 g of $CeO_2$ powder with 0.03 g of PVDF as a binder, 0.03 g of Super-P as a conductive material, and 1 mL of NMP as an organic solvent. Next, the slurry was applied onto a copper foil having a thickness of 25 μm and dried in a vacuum oven to fabricate a cathode functional layer having a thickness of about 200 μm (130 of FIG. 5).

A separating membrane (150 of FIG. 5) was fabricated by wetting polypropylene (PP) having a thickness of 20 μm with 1 M of $LiPF_6$ EC/DEC electrolyte.

A lithium foil having a thickness of 400 μm was used as the ion generating layer (160 of FIG. 5).

The copper foil on which the cathode functional layer was formed was placed on the cathode case, the ion generating layer was placed on the anode case, the separating membrane was placed between the cathode functional layer and the ion generating layer, and the cell was fabricated by fastening the cathode case and the anode case such that the internal layers were fully brought into close contact with each other.

An OCV (open circuit voltage) of the fabricated cell was measured to obtain a result value of about 3 V in comparison with lithium, and then, a constant current of −10 μA was caused to flow through the cell. The voltage of the cell gradually decreased from about 3 V (vs. $Li^+/Li$), and the reaction proceeded. The constant current was applied until the cell voltage reached 0 V (vs. $Li^+/Li$). The reaction of the cathode functional layer with a decrease in cell voltage was measured and shown in FIG. 7.

After completion of the reaction, the fabricated cell was disassembled and the cathode functional layer was separated. The separated cathode functional layer was cleaned with acetone, and the cerium oxide nanoparticles of condensed form were separated separately and cleaned with distilled water. Next, the cerium oxide nanoparticles of condensed form were further cleaned with a 10% aqueous acetic acid solution and neutralized with distilled water. Accordingly, cerium oxide nanoparticles including surface defects were fabricated.

Experimental Example 2

Cerium oxide nanoparticles were fabricated in the same manner as in Experimental example 1 except that the constant current was applied until the cell voltage reached 1.4 V (vs. $Li^+/Li$) in Experimental example 1.

Experimental Example 3

Cerium oxide nanoparticles were fabricated in the same manner as in Experimental example 1 except that the constant current was applied until the cell voltage reached 1.8 V (vs. $Li^+/Li$) in Experimental example 1.

Comparative Example

The $CeO_2$ powder (particle size of about 50 nm to about 70 nm) used in Experimental example 1 was used as a comparative example.

Evaluation

The TEM measurement results of the cerium oxide particles fabricated by Experimental examples 1 to 3 are shown in FIG. 7. Further, the TEM measurement results of the cerium oxide particles fabricated in Experimental example 1 and Comparative example are shown in FIG. 8. Referring to FIGS. 7 and 8, it is possible to confirm that the cerium oxide particles fabricated are atomized as lithium ions are injected into the cerium oxide particles.

The XPS measurement results of the cerium oxide particles fabricated by the above Experimental example 1 and Comparative example are shown in FIG. 9. Referring to FIG. 9, as compared with the cerium oxide particles fabricated by the above comparative example, in the cerium oxide particles fabricated according to Experimental example 1, binding energy region corresponding to a Ce—O bond (that is, a $Ce^{4+}$—$O^{2-}$ bond) decreased, and the energy region corresponding to the oxygen vacancy (O-vacancy) increased. Therefore, it is possible to confirm that cerium oxide nanoparticles having increased surface defects (for example, $Ce^{3+}$ and oxygen vacancy) may be fabricated by the lithium ions injected into and desorbed from the cerium oxide particles.

In addition, the oxygen vacancy ratio of the surface of the cerium oxide nanoparticles fabricated according to Experimental examples 1 to 3 was measured and shown in Table 1 below.

[Table 1]

TABLE 1

|  | Experimental Example 1 | Experimental Example 2 | Experimental Example 3 |
|---|---|---|---|
| Potential (vs Li+/Li) | 0 V | 1.4 V | 1.8 V |
| O-vacancy (%) | 49.8 | 35 | 19.7 |

Referring to Table 1 above, it is possible to confirm that the oxygen vacancy of the surface of the fabricated cerium oxide nanoparticles increase as lithium ions are injected into the cerium oxide particles.

As mentioned above, the cerium oxide nanoparticles according to some embodiments may be fabricated by injecting and desorbing metal ions into and from the cerium oxide particles. Accordingly, it is possible to provide cerium oxide nanoparticles with controlled surface defects.

Furthermore, as described above, the $Ce^{3+}$ concentration and oxygen vacancy ratio of the surface of the cerium oxide nanoparticles according to some embodiments may be quantified depending on the degree of injection of metal ions. Accordingly, it is possible to provide a method for fabricating cerium oxide nanoparticles which easily controls the surface defect.

Hereinafter, the method for fabricating the semiconductor device according to some embodiments of the present invention will be described referring to FIGS. 10 to 14. However, these are merely examples, and the present invention is not limited to these embodiments. For convenience of explanation, repeated parts of contents described using FIGS. 1 to 9 will be briefly described or omitted.

Figure 10:
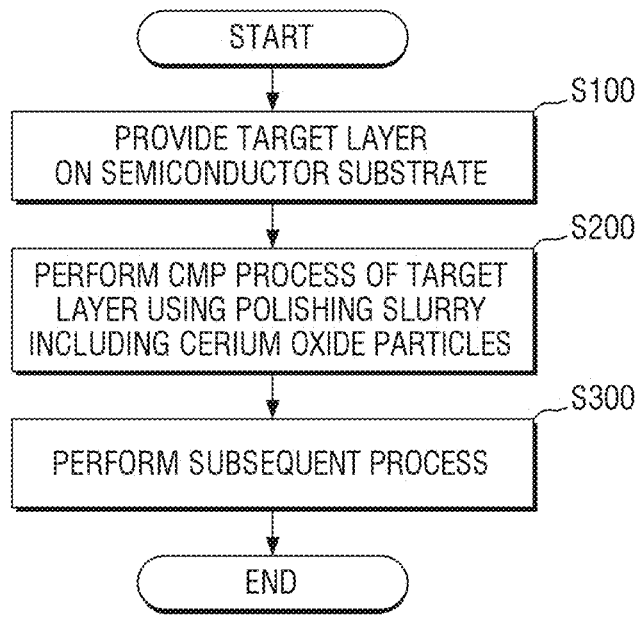
FIG. 10 is a flowchart for explaining the method for fabricating the semiconductor element according to some embodiments of the present invention.

FIG. 10 is a flowchart for explaining a method for fabricating a semiconductor element according to some embodiments of the present invention. FIGS. 11 to 14 are intermediate step diagrams for explaining the method for fabricating the semiconductor device according to some embodiments of the present invention.

Referring to FIGS. 10 to 13, a target film 40 may be provided on the semiconductor substrate 10 (S100).

Figure 11:
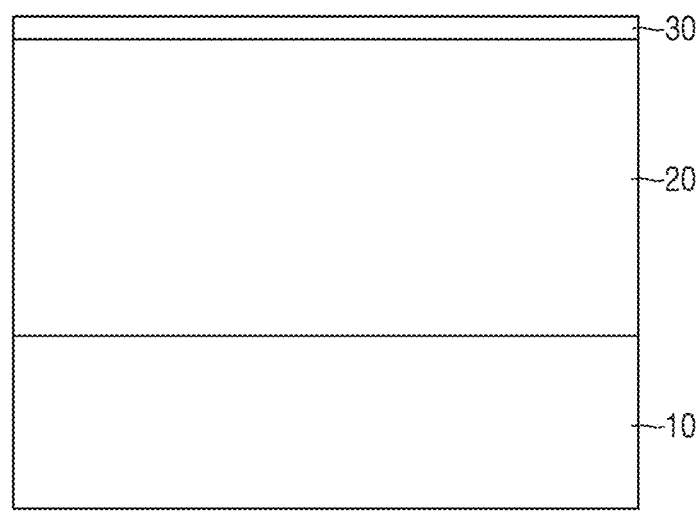
FIGS. 11 to 14 are intermediate step diagrams for explaining the method for fabricating the semiconductor device according to some embodiments of the present invention.

For example, as shown in FIG. 11, an interlayer insulating film 20 and an insertion film 30 may be sequentially formed on the semiconductor substrate 10.

The semiconductor substrate 10 may be, for example, bulk silicon or silicon on insulator (SOI). In some embodiments, the semiconductor substrate 10 may be a silicon substrate or may include other materials, for example, but are not limited to, silicon germanium, silicon germanium-on-insulator (SGOI), indium antimonide, lead telluride compounds, indium arsenide, indium phosphide, gallium arsenide or gallium antimonide. For convenience of explanation, the semiconductor substrate 10 will be described below as a silicon substrate.

The interlayer insulating film 20 may be stacked on the semiconductor substrate 10. The interlayer insulating film 20 may include, for example, but is not limited to, at least one of a silicon oxide, a silicon nitride, a silicon oxynitride, and a combination thereof.

The insertion film 30 may be stacked on the interlayer insulating film 20. The insertion film 30 may function as an etching stop layer in a chemical mechanical polishing process to be described later.

Figure 12:
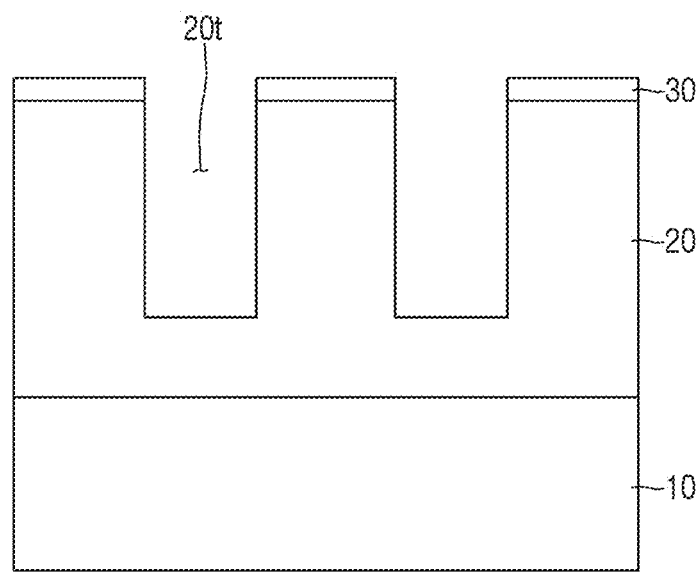

Subsequently, as shown in FIG. 12, a trench 20t may be formed in the interlayer insulating film 20 and the insertion film 30. The trench 20t may be formed by etching a part of the interlayer insulating film 20 and a part of the insertion film 30. In some embodiments, the trench 20t may have a width of about 10 nm or less.

Figure 13:
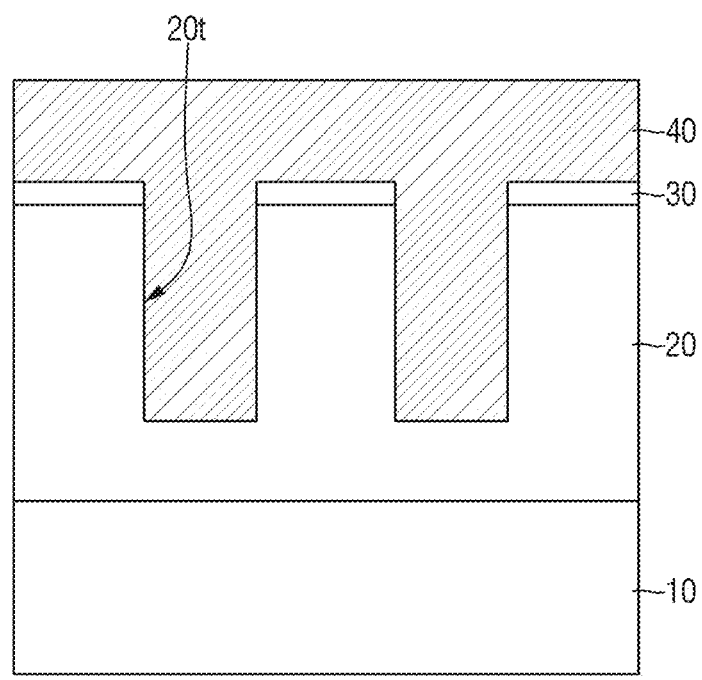

Subsequently, as shown in FIG. 13, the target film 40 may be formed on the interlayer insulating film 20 and the insertion film 30. The target film 40 may be formed to fill the trench 20t.

The target film 40 may include at least one of a semiconductor material, a conductive material, an insulating material, and a combination thereof. As an example, the target film 40 may include semiconductor materials such as polysilicon and/or epitaxial layers. As another example, the target film 40 may include conductive materials such as doped polysilicon, metal, metal silicide and/or metal nitride. As still another example, the target film 40 may include an insulating material such as silicon oxide, silicon nitride, silicon oxynitride, a low dielectric constant (low-k) material having a lower dielectric constant than silicon oxide, and/or a high dielectric constant (high-k) material having a higher dielectric constant than silicon oxide.

Although the target film 40 is only shown as being formed of a single film, this is merely an example, and the target film 40 may, of course, be formed of a multi-film in which a plurality of films are stacked. As an example, the target film 40 may include a plurality of stacked insulating films or may include a conductive film or a semiconductor film interposed between the stacked insulating films.

Figure 14:
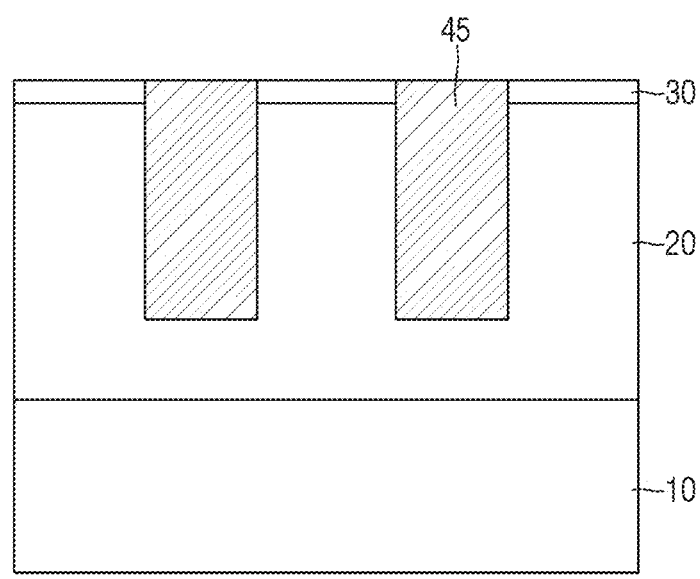

Referring to FIGS. 10, 13 and 14, a chemical mechanical polishing process may be performed on the target film 40 (S200).

The chemical mechanical polishing process on the target film 40 may utilize cerium oxide nanoparticles according to some embodiments. For example, the polishing slurry including the above-mentioned cerium oxide nanoparticles may be fabricated using the methods described with reference to FIGS. 1 to 9. Subsequently, the polishing slurry may be provided between the semiconductor substrate 10 on which the target film 40 is formed and the polishing pad, and the target film 40 may be brought into contact with the polishing pad and rotated. The chemical mechanical polishing process may be performed, for example, until the insertion film 30 is exposed. As a result, the target pattern 45 that fills the trench 20t may be formed.

The cerium oxide nanoparticles according to some embodiments may have relatively large surface defects. For example, as mentioned above, cerium oxide nanoparticles according to some embodiments may have a relatively large $Ce^{3+}$ concentration and oxygen vacancies (e.g., oxygen vacancy ratio up to about 50%). The chemical mechanical polishing process using cerium oxide nanoparticles according to some embodiments may have improved polishing efficiency accordingly.

Next, referring to FIG. 10, a subsequent process is performed (S300).

The subsequent process may include various semiconductor processes on the semiconductor substrate 10 and/or the target pattern 45. For example, the semiconductor processes may include, but are not limited to, a deposition process, an etching process, an ion process, a cleaning process, and the like. The aforementioned semiconductor processes may include a test process on a semiconductor device of a wafer level. As the subsequent processes are performed, various integrated circuits and wirings required for semiconductor devices may be formed.

When the semiconductor chips are formed on the semiconductor substrate 10 through the aforementioned semiconductor processes, each semiconductor chip may be individualized. The individualization of each semiconductor chip may be performed, for example, through a sawing process using a blade or a laser. After that, a packaging process may be performed on each semiconductor chip. The packaging process may mean a process of mounting each semiconductor chip on a circuit board (for example, a printed circuit board) and sealing it with a sealing material. Further, the packaging process may include a process of stacking a large number of semiconductor chips on the circuit substrate in multi-layer to form a stack package or stacking the stack package on the stack package to form a package-on-package (POP) structure. The semiconductor package may be formed through the packaging process on each semiconductor chip. The semiconductor processes may also include a test process on the semiconductor device of package level.

In concluding the detailed description, those skilled in the art will appreciate that many variations and modifications may be made to the embodiments described herein without substantially departing from the principles of the present invention. Therefore, the embodiments described herein are to be considered illustrative, and not restrictive.

What is claimed is:

1. A method for fabricating cerium oxide nanoparticles, the method comprising:
providing a structure that includes a cathode functional layer including cerium oxide particles, an ion generating layer including metal and a separating membrane between the cathode functional layer and the ion generating layer;
applying a voltage across the cathode functional layer and the ion generating layer, thereby injecting metal ions generated from the ion generating layer into the cathode functional layer; and
cleaning the cathode functional layer to remove at least some of the metal ions from the cathode functional layer.

2. The method for fabricating cerium oxide nanoparticles of claim 1, wherein an oxygen vacancy ratio of surfaces of the cerium oxide nanoparticles is about 20% to about 50% after cleaning the cathode functional layer.

3. The method for fabricating cerium oxide nanoparticles of claim 1, wherein the ion generating layer includes at least one of an alkali metal, an alkaline earth metal, an alkali metal-containing alloy, and an alkaline earth metal-containing alloy.

4. The method for fabricating cerium oxide nanoparticles of claim 3, wherein the ion generating layer includes at least one of lithium (Li), sodium (Na), potassium (K), magnesium (Mg), and calcium (Ca).

5. The method for fabricating cerium oxide nanoparticles of claim 1, wherein the separating membrane includes an electrolyte including metal ions and a porous polymer that is wetted with the electrolyte, and the metal ions of the electrolyte and the metal ions generated from the ion generating layer include the same metallic element.

6. The method for fabricating cerium oxide nanoparticles of claim 1, wherein cleaning of the cathode functional layer includes cleaning of the cathode functional layer using an organic solvent.

7. The method for fabricating cerium oxide nanoparticles of claim 6, wherein cleaning of the cathode functional layer further includes cleaning of the cathode functional layer using at least one of distilled water and an acidic aqueous solution after cleaning the cathode functional layer using the organic solvent.

8. The method for fabricating cerium oxide nanoparticles of claim 1, further comprising drying the cathode functional layer after cleaning the cathode functional layer.

9. A method for fabricating cerium oxide nanoparticles, the method comprising:
   providing a cell that includes a cathode functional layer including cerium oxide particles, an ion generating layer including lithium (Li), and a separating membrane between the cathode functional layer and the ion generating layer;
   applying a voltage to the cell to inject lithium ions into the cathode functional layer;
   separating the cathode functional layer from the cell; and
   cleaning the cathode functional layer using an organic solvent.

10. The method for fabricating cerium oxide nanoparticles of claim 9, wherein an oxygen vacancy ratio of surfaces of the cerium oxide nanoparticles is about 20% to about 50% after cleaning the cathode functional layer.

11. The method for fabricating cerium oxide nanoparticles of claim 9, wherein the cathode functional layer is fabricated by providing a slurry including $CeO_2$ powder, a binder, a conductive material, and an organic solvent,
   applying the slurry onto a base layer, and
   drying the slurry applied onto the base layer.

12. The method for fabricating cerium oxide nanoparticles of claim 9, wherein the separating membrane includes an electrolyte including lithium ions and a porous polymer that is wetted with the electrolyte.

13. The method for fabricating cerium oxide nanoparticles of claim 12, wherein the electrolyte includes $LiPF_6$.

14. The method for fabricating cerium oxide nanoparticles of claim 9, wherein the organic solvent includes at least one of acetone, ethanol, anhydrous tetrahydrofuran (THF), benzene, potassium hydroxide/methanol, methanol, toluene, dichloromethane, hexane, dimethylmethanamide, dimethylformamide (DMF), diisopropyl ether, diethyl ether, dioxane, dimethylacetamide (DMA), dimethyl sulfoxide (DMSO), and chlorobenzene.

15. The method for fabricating cerium oxide nanoparticles of claim 9, further comprising after cleaning the cathode functional layer with the organic solvent, cleaning the cathode functional layer with distilled water, cleaning the cathode functional layer with an acidic aqueous solution, and neutralizing the cathode functional layer.

16. The method for fabricating cerium oxide nanoparticles of claim 15, wherein the acidic aqueous solution includes an acetic acid aqueous solution.

* * * * *